US009460072B2

(12) United States Patent
Balasubramanian et al.

(10) Patent No.: US 9,460,072 B2
(45) Date of Patent: *Oct. 4, 2016

(54) ENHANCED SCREEN CAPTURE FOR FORM MANIPULATION

(71) Applicant: International Business Machines Corporation, Armonk, NY (US)

(72) Inventors: Swaminathan Balasubramanian, Southfield, MI (US); Andrew R. Jones, Round Rock, TX (US); Brian M. O'Connell, Cary, NC (US); Keith R. Walker, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 621 days.

This patent is subject to a terminal disclaimer.

(21) Appl. No.: 13/943,387

(22) Filed: Jul. 16, 2013

(65) Prior Publication Data

US 2013/0305134 A1 Nov. 14, 2013

Related U.S. Application Data

(63) Continuation of application No. 12/510,758, filed on Jul. 28, 2009, now Pat. No. 8,571,319.

(51) Int. Cl.
*G06K 9/00* (2006.01)
*G06F 17/24* (2006.01)

(52) U.S. Cl.
CPC ......... *G06F 17/243* (2013.01); *G06K 9/00449* (2013.01)

(58) Field of Classification Search
CPC ..................... G06K 9/00456; G06K 9/00463; H04N 1/40062; G06T 7/0081; G06T 2207/30176

See application file for complete search history.

(56) References Cited

U.S. PATENT DOCUMENTS

| 5,953,481 | A | 9/1999 | Watanabe et al. |
| 6,718,337 | B1 | 4/2004 | Klein et al. |
| 7,430,058 | B2 | 9/2008 | Silverbrook et al. |
| 8,169,651 | B2 | 5/2012 | Aoki |
| 8,571,319 | B2 * | 10/2013 | Balasubramanian . G06F 17/243 382/176 |
| 9,088,767 | B2 | 7/2015 | Balasubramanian et al. |
| 2002/0141731 | A1 | 10/2002 | Elberbaum |

(Continued)

FOREIGN PATENT DOCUMENTS

| CN | 201222256 | 4/2009 |
| JP | 2004213246 A | 7/2004 |

(Continued)

OTHER PUBLICATIONS

Notice of Allowance, dated Mar. 12, 2015, regarding U.S. Appl. No. 13/646,881, 15 pages.

(Continued)

*Primary Examiner* — Duy M Dang
(74) *Attorney, Agent, or Firm* — Yee & Associates, P.C.; Lisa J. Ulrich

(57) ABSTRACT

Processing a form in an image is provided. A plurality of data fields is detected within the form in the image. One or more of the data fields that contain private data and a plurality of the data fields that do not contain private data are detected. Contents of the plurality of data fields that do not contain private data are stored as metadata for the image and contents of the one or more data fields that contain private data are not stored as metadata for the image.

12 Claims, 6 Drawing Sheets

(56) References Cited

U.S. PATENT DOCUMENTS

| | | |
|---|---|---|
| 2004/0018002 A1 | 1/2004 | Kato et al. |
| 2004/0103409 A1 | 5/2004 | Hayner et al. |
| 2004/0197080 A1 | 10/2004 | Bak |
| 2006/0080432 A1 | 4/2006 | Spataro et al. |
| 2006/0088282 A1 | 4/2006 | Takagi |
| 2006/0140591 A1 | 6/2006 | Estevez et al. |
| 2006/0156355 A1 | 7/2006 | Kawasaki et al. |
| 2007/0217763 A1 | 9/2007 | Siemens et al. |
| 2007/0248312 A1 | 10/2007 | Kobayashi |
| 2007/0273898 A1 | 11/2007 | Toda |
| 2008/0260348 A1 | 10/2008 | Maeda et al. |
| 2008/0298773 A1 | 12/2008 | Honjo |
| 2009/0132918 A1 | 5/2009 | Deyo et al. |
| 2010/0095208 A1 | 4/2010 | White et al. |
| 2011/0026828 A1 | 2/2011 | Balasubramanian et al. |
| 2011/0289117 A1 | 11/2011 | Agrawal et al. |
| 2014/0099069 A1 | 4/2014 | Balasubramanian et al. |

FOREIGN PATENT DOCUMENTS

| | | |
|---|---|---|
| JP | 2006106937 A | 4/2006 |
| JP | 2007214611 A | 8/2007 |
| KR | 20060010277 A | 2/2006 |
| KR | 20070011970 A | 1/2007 |
| WO | 2011081931 A2 | 7/2011 |

OTHER PUBLICATIONS

Balasubramanian et al., "Activites Duplication Via Recorded Video," U.S. Appl. No. 13/646,881, filed Oct. 8, 2012, 59 pages.

"A Scheme for Automatically Copying Images to a Blog Server," IP.com Prior Art Database Technical Disclosure No. IPCOM000013114D, Jun. 13, 2003, 3 pages.

"Receiving Device Instructions from One User to Be Overlaid on an Image or Video of the Device for Another User," IP.com Prior Art Database Technical Disclosure No. IPCOM/000207134D, May 17, 2011, 21 pages.

"Recommending Video Programs Based on Audio Fingerprints," IP.com Prior Art Database Technical Disclosure No. IPCOM/000185993D, Aug. 4, 2009, 25 pages.

Cardinaels et al., "Automating Metadata Generation: The Simple Indexing Interface," Proceedings of the 14th International Conference on the World Wide Web (WWW '05), May 2005, pp. 548-556.

Hindus et al., "Ubiquitous Audio: Capturing Spontaneous Collaboration," Proceedings of the 1992 ACM conference on Computer-Supported Cooperative Work, Nov. 1992, pp. 210-217.

Stokrp, "Using Simulation to Size Document Imaging Systems," Proceedings of the 1994 Summer Computer Simulation Conference, Jul. 1994, pp. 202-107.

Non-Final Office Action dated Jan. 7, 2013 regarding U.S. Appl. No. 12/510,758, 10 pages.

Notice of Allowance dated Jun. 20, 2013 regarding U.S. Appl. No. 12/510,758, 10 pages.

Office Action dated Nov. 5, 2014, regarding U.S. Appl. No. 13/646,881, 36 pages.

* cited by examiner

ENHANCED SCREEN CAPTURE FOR FORM MANIPULATION

This application is a continuation of and claims the benefit of priority to U.S. patent application Ser. No. 12/510,758, filed on Jul. 28, 2009 entitled "Enhanced Screen Capture for Form Manipulation", the contents of which are hereby incorporated by reference.

BACKGROUND

1. Field

The disclosure relates generally to capturing information from a computer screen and more specifically to storing information about the data that has been input by an end user in web based forms.

2. Description of the Related Art

Screen capture technology and computer based forms are separate technologies that are well known in the art. Screen capture software programs create a static copy of computer screens or subsets of computer screens, such as regions or specific windows, and digitally store them as binary image data in common formats such as Joint Photographic Experts Group (JPEG) or Tag Image File Format (TIFF) files which can easily be shared between users. These file formats may also contain additional information about the image, often called metadata, which may describe the location of the image, reference a specific location in the images, and specify the time the image was created.

Computer based forms provide users a means to input information in response to prompts in the form itself. Information may be input using entry fields, selection boxes, and check boxes, for example. Forms are used to gather information and transmit the information to the server or client based applications which process user input. Examples of forms may be an online order or reservation form and a local database or spreadsheet form.

SUMMARY

According to one illustrative embodiment, a method for processing a form in an image is provided. One or more processors detect a plurality of data fields within the form in the image. The one or more processors identify one or more of the data fields that contain private data and a plurality of the data fields that do not contain private data. Contents of the plurality of data fields that do not contain private data are stored as metadata for the image and contents of the one or more data fields that contain private data are not stored as metadata for the image. According to other illustrative embodiments, a computer program product and a computer system for processing a form in an image also are provided.

BRIEF DESCRIPTION OF THE SEVERAL VIEWS OF THE DRAWINGS

The novel features believed characteristic of the illustrative embodiments are set forth in the appended claims. The illustrative embodiments themselves, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
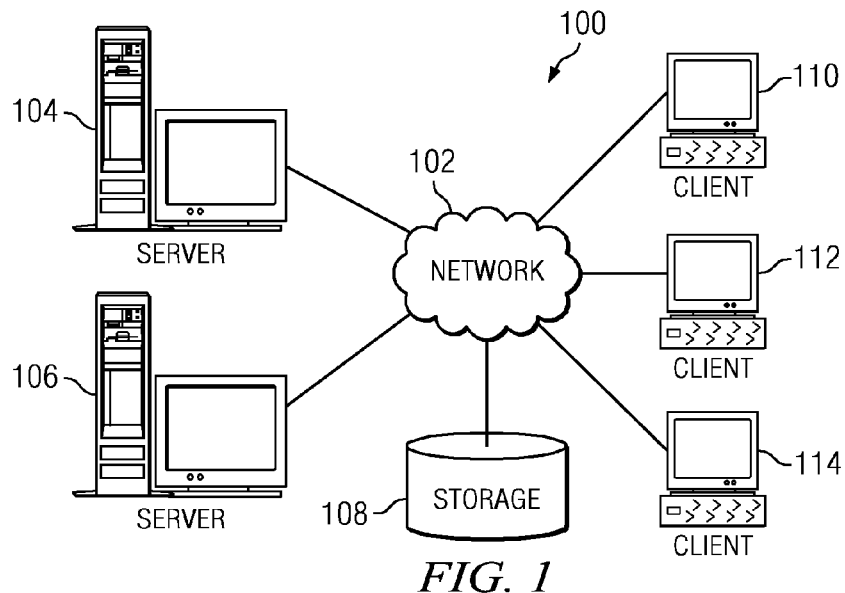
FIG. 1 is a pictorial representation of a network of data processing systems in which illustrative embodiments may be implemented.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.), or an embodiment combining software and hardware aspects that may all generally be referred to herein as a "circuit," "module," or "system." Furthermore, aspects of the present invention may take the form of a computer program product stored on one or more computer-readable device having computer-readable program code embodied thereon.

Any combination of one or more computer-readable devices may be utilized. A computer-readable storage device may be, for example, but not limited to, an electronic, magnetic, optical, or semiconductor system, apparatus, or device, or any suitable combination of the foregoing. More specific examples (a non-exhaustive list) of the computer-readable storage device would include the following: a portable computer diskette, a hard disk, a random access memory (RAM), a read-only memory (ROM), an erasable programmable read-only memory (EPROM or Flash memory), a portable compact disc read-only memory (CDROM), an optical storage device, a magnetic storage device, or any suitable combination of the foregoing. In the context of this document, a computer-readable device may be any tangible medium that can store a program for use by or in connection with an instruction execution system, apparatus, or device. The term "computer-readable storage device" does not encompass a signal propagation media, such as a copper wire, optical fiber, or wireless transmission media.

Program code embodied on a computer-readable storage device may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++, or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable storage device that can direct a computer, other programmable data processing apparatus, or other devices to function in a particular manner, such that the instructions stored in the computer-readable storage device produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer, or other programmable apparatus or other devices to produce a computer implemented process such that the instructions which execute on the computer or other programmable apparatus provide processes for implementing the functions/acts specified in the flowchart and/or block diagram block or blocks.

Figure 2:
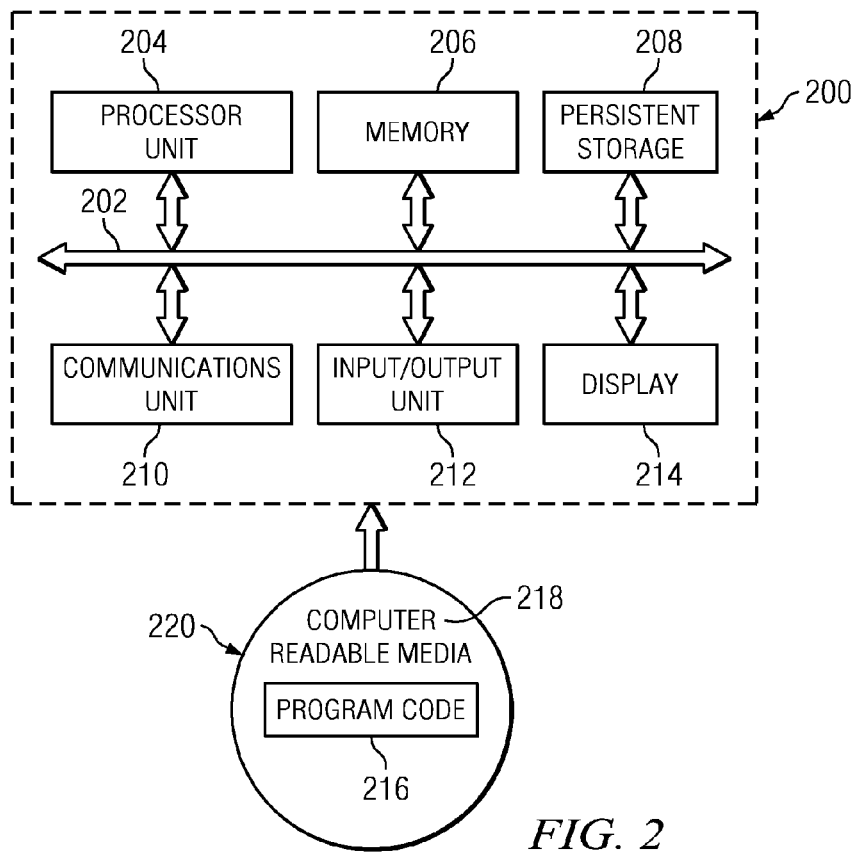
FIG. 2 is a block diagram of a data processing system in which illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications, such as electronic mail applications and calendar applications, to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational, and other computer systems that route data and messages. Of course, network data processing system 100 also may be implemented as a number of different types of networks, such as, for example, an intranet, a local area network (LAN), or a wide area network (WAN). FIG. 1 is intended as an example, and not as an architectural limitation for the different illustrative embodiments.

With reference now to FIG. 2, a block diagram of a data processing system is shown in which illustrative embodiments may be implemented. Data processing system 200 is an example of a computer, such as server 104 or client 110 in FIG. 1, in which computer usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, display 214, and meeting manager 222.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable storage device, such as memory 206 or persistent storage 208.

Program code 216 is located in a functional form on computer readable media 218 that is selectively removable and may be loaded onto or transferred to data processing system 200 for execution by processor unit 204. Program code 216 and computer readable media 218 form computer program product 220 in these examples. In one example, computer readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 218 also may take the form of a persistent storage, such as a hard drive, a thumb drive, or a flash memory that is connected to data processing system 200. The tangible form of computer readable media 218 is also referred to as computer recordable storage media. In some instances, computer recordable media 218 may not be removable.

Alternatively, program code 216 may be transferred to data processing system 200 from computer readable media 218 through a communications link to communications unit 210 and/or through a connection to input/output unit 212. The communications link and/or the connection may be physical or wireless in the illustrative examples.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown.

As one example, a computer-readable storage device in data processing system 200 is any hardware apparatus that may store data. Memory 206, persistent storage 208, and computer readable media 218 are examples of computer-readable storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache, such as found in an interface and memory controller hub that may be present in communications fabric 202.

The illustrative embodiments recognize a need for automating form population by embedding metadata within an image that captures the form data that can later be extracted to populate a form for the same or another user. In an advantageous embodiment, these methods permit people to automate form filling based on screen captures. In one illustrative embodiment, it is common for people in support roles or lower level information technology roles to view documentation containing numerous screen shots walking a user through steps to solve a problem or configure a system. This is often done with the use of a web browser interface.

The illustrative embodiments recognize that although current methods create a field capture where field identifiers and values are extracted from a form that may be shared as scripts, the scripts do not contain graphical elements. Current methods, therefore, do not allow for sending or storing a graphical element that a user may preview, nor do current methods allow for the ability to recognize opportunities to use the metadata when the context is different, but the form is the same or similar. For example, current methods do not allow a user to take a screen capture of a database record entry screen, and apply that screen capture to different database screens, different databases, or different platforms, such as web forms. While current methods create a static copy of a screen or window, the static copy does not include context or metadata about the contents of the captured image. If the copy of a screen or window includes a form, current methods only capture a binary representation of the image being displayed in the instant it was captured, but do not capture any information about the form or its contents.

Therefore, the illustrative embodiments provide a method, computer program product, and computer system for processing a form in an image is provided. One or more processors detect a plurality of data fields within the form in the image. The one or more processors identify one or more of the data fields that contain private data and a plurality of the data fields that do not contain private data. Contents of the plurality of data fields that do not contain private data are stored as metadata for the image and contents of the one or more data fields that contain private data are not stored as metadata for the image. Furthermore, methods are described to protect sensitive information where appropriate.

In another illustrative embodiment, an access request for a form is detected. A determination is made as to whether the form corresponds to a stored image in a number of stored images. If the form corresponds to a stored image, metadata associated with the stored image is retrieved. The metadata includes a number of field values and associated textual data corresponding to the form. The form is populated with the number of field values and the associated textual data from the metadata associated with the stored image.

Figure 3:
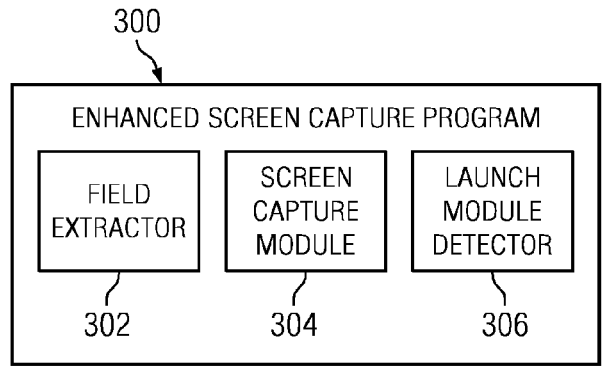
FIG. 3 is a block diagram of an enhanced screen capture program in which illustrative embodiments may be implemented.

With reference now to FIG. 3, a block diagram of an enhanced screen capture program is depicted in which illustrative embodiments may be implemented. Enhanced screen capture program 300 may be implemented in a data processing system, such as data processing system 200 in FIG. 2.

Enhanced screen capture program 300 includes field extractor 302, screen capture module 304, and launch module detector 306. Field extractor 302 detects textual data and other values within a number of fields of a computer based form, and extracts the textual data and other values from those fields. Screen capture module 304 captures the binary representation of a computer based form. Launch module detector 306 detects the application containing the captured binary representation of the computer based form. In some illustrative embodiments, launch module detector 306 may detect the commands to set the application to the state corresponding to the form. In an illustrative example, if a form is a web form, the web browser application and URL of the form may be detected by launch module detector 306.

Figure 4:
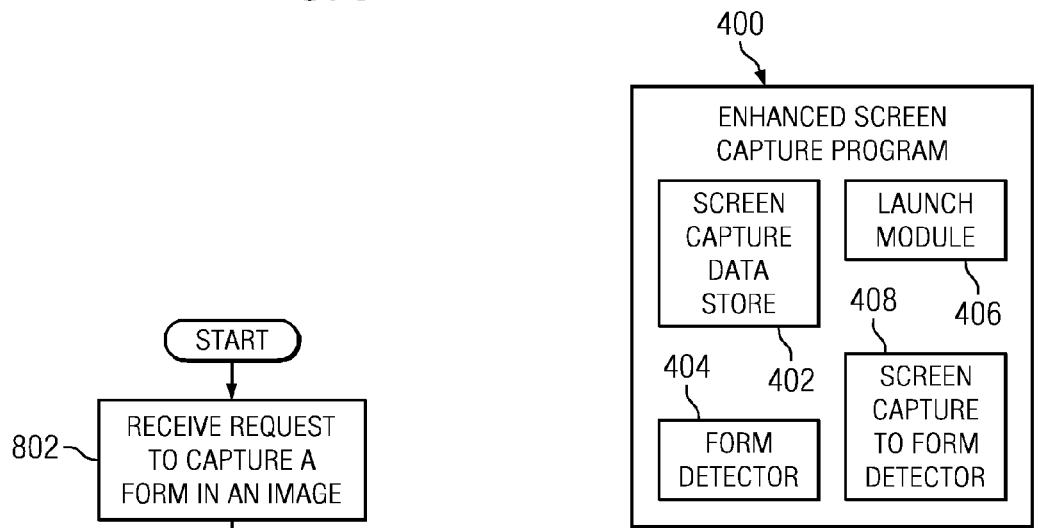
FIG. 4 is a block diagram of an enhanced screen capture program in which illustrative embodiments may be implemented.

With reference now to FIG. 4, a block diagram of an enhanced screen capture program is depicted in which illustrative embodiments may be implemented. Enhanced screen capture program 400 may be implemented in a data processing system, such as data processing system 200 in FIG. 2.

Enhanced screen capture program 400 includes screen capture data store 402, form detector 404, launch module 406, and screen capture to form detector 408. Screen capture data store 402 contains the stored screen captures, such as from a local or remote enhanced screen capture program 300 for example. Form detector 404 detects the existence of a form, such as within a web browser or application containing forms for example. Launch module 406 launches the application corresponding with the captured binary representation of the computer based form. In some illustrative embodiments, launch module 406 includes commands to set the application to the state corresponding to the form. In an illustrative example, if a form is a web form, a web browser may be launched with a command line argument containing the universal record locator (URL) of the form. Screen capture to form detector 408 detects if a form within an application matches a stored form in screen capture data store 402.

Figure 5:
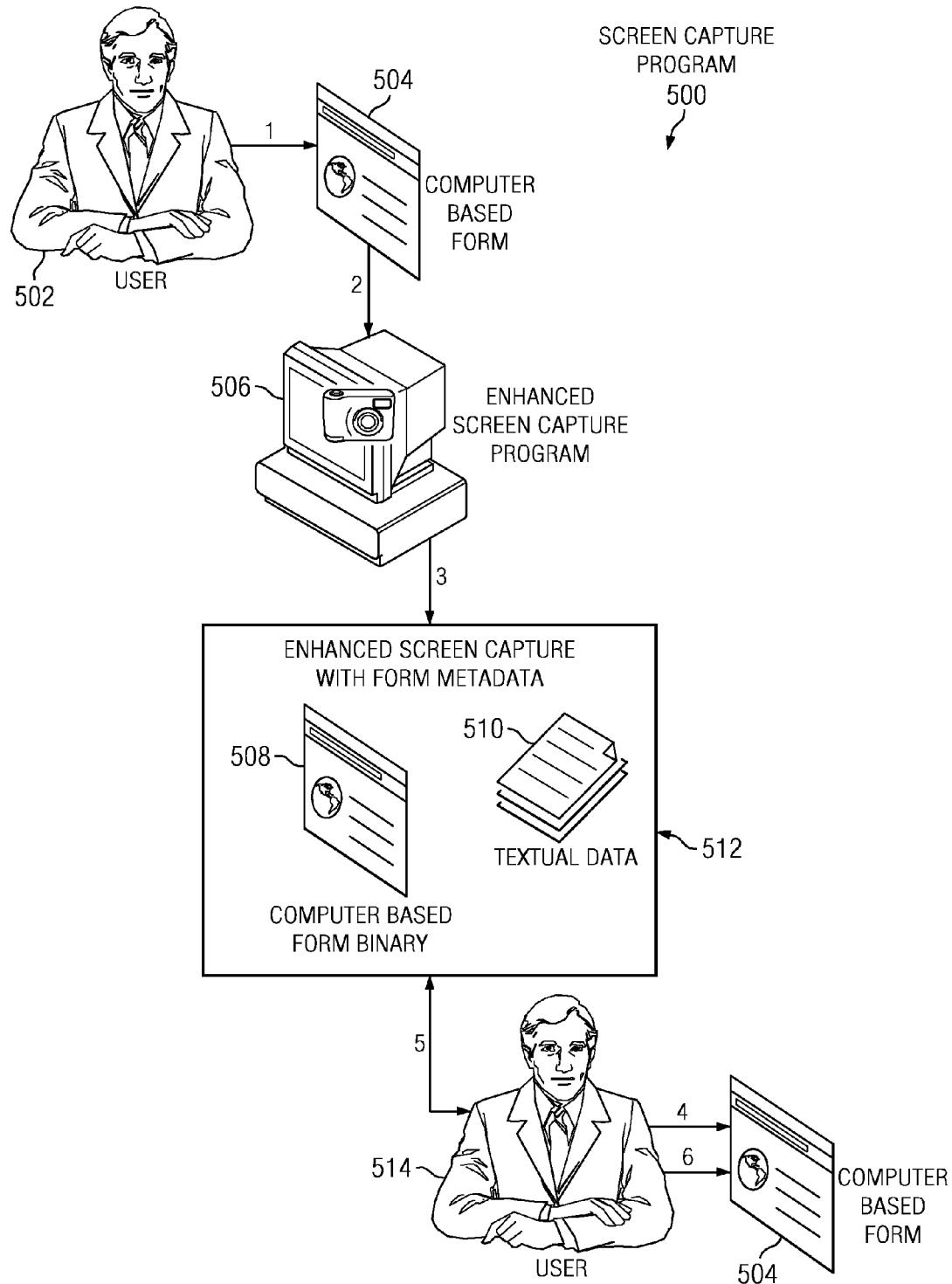
FIG. 5 is a block diagram of a screen capture program in which illustrative embodiments may be implemented.

With reference now to FIG. 5, a block diagram of a screen capture program is depicted in which illustrative embodiments may be implemented. Screen capture program 500 may be implemented in a data processing system, such as data processing system 200 in FIG. 2.

User 502 runs a computer program that provides computer based form 504 requiring user input. In this illustrative example, user 502 is a human user, however user 502 may be any type of user including, without limitation, a human user, a program, or any other process executing on a device, such as data processing system 200 in FIG. 2, for example. In an illustrative example, where user 502 is a process, enhanced screen capture program 506 may be invoked by a system event, such as a scheduled task that launches a form, for example.

In an illustrative embodiment, computer based form 504 may be, for example, part of a process such as problem resolution, problem acknowledgement, software configuration, order entry, feedback, survey, and the like. Computer based form 504 may extend to any application with a form to process, such as wizards, open dialogue boxes, and the like. After user 502 enters data into computer based form 504, user 502 may invoke enhanced screen capture program 506. Enhanced screen capture program 506 captures computer based form binary 508, which is the binary representation of computer based form 504, as well as textual data 510, which includes the field values and any associated textual data within the field values of computer based form 504. Computer based form binary 508 and textual data 510 are stored as enhanced screen capture with form metadata 512. Associated textual data may include links to other screen captures if in a sequence, field labels, form text, CRC of the computer based form, and any other form data that may be used to identify the same or similar form when used.

In an illustrative embodiment, enhanced screen capture with form metadata 512 may be stored as an image file, such as, without limitation, a JPEG file, a TIFF file, Graphics Interchange Format (GIF) file, Portable Document Format (PDF) file, and the like. Enhanced screen capture with form metadata 512 may be stored in a number of ways, including, without limitation, as a single file, multiple files, a single file with references or links to other files, a database entity, or other complex data type. Enhanced screen capture with form metadata 512 may be stored in a number of locations, such as, without limitation, a local file, in a local datastore, in a remote datastore, a MIME attachment to an electronic message, an image within a Lotus Notes Document©, and the like. If enhanced screen capture with form metadata 512 is stored externally, or remotely, an extra step will be needed to catalogue the image metadata and index the image to the corresponding metadata. This cataloguing step may be executed using, for example, a cyclic redundancy check function. It is possible to have two cyclic redundancy check values that correspond to two different image files. Because of this, using the cyclic redundancy check function may also be accompanied by assigning a unique identifier to the image file that corresponds to a data tag associated with the image metadata. As a result, illustrative embodiments may identify private text data as private based on respective data field identifiers.

User 514 may be the same as user 502 or may be a different user. User 514 runs the same computer program that provides computer based form 504 requiring user input. User 514 is able to retrieve enhanced screen capture with form metadata 512 stored by enhanced screen capture program 506 earlier. User 514 can then populate the form with the same data user 502 entered into computer based form 504 using textual data 510. In another illustrative embodiment, user 514 may invoke an auto-fill feature that triggers enhanced screen capture program 506 to automatically populate computer based form 504 with the same data user 502 entered into computer based form 504. Enhanced screen capture program 506 may also be used by leveraging known methods. For example, in an illustrative embodiment, enhanced screen capture with form metadata 512 could be dragged onto a web browser with an empty form and a plugin within the web browser could extract textual data 510 associated with enhanced screen capture with form metadata 512 and complete the form. In another illustrative example, user 514 may invoke an interpretation program, load enhanced screen capture with form metadata 512 into the interpretation program, and use the interpretation program to fill out the form on another program.

Figure 6:
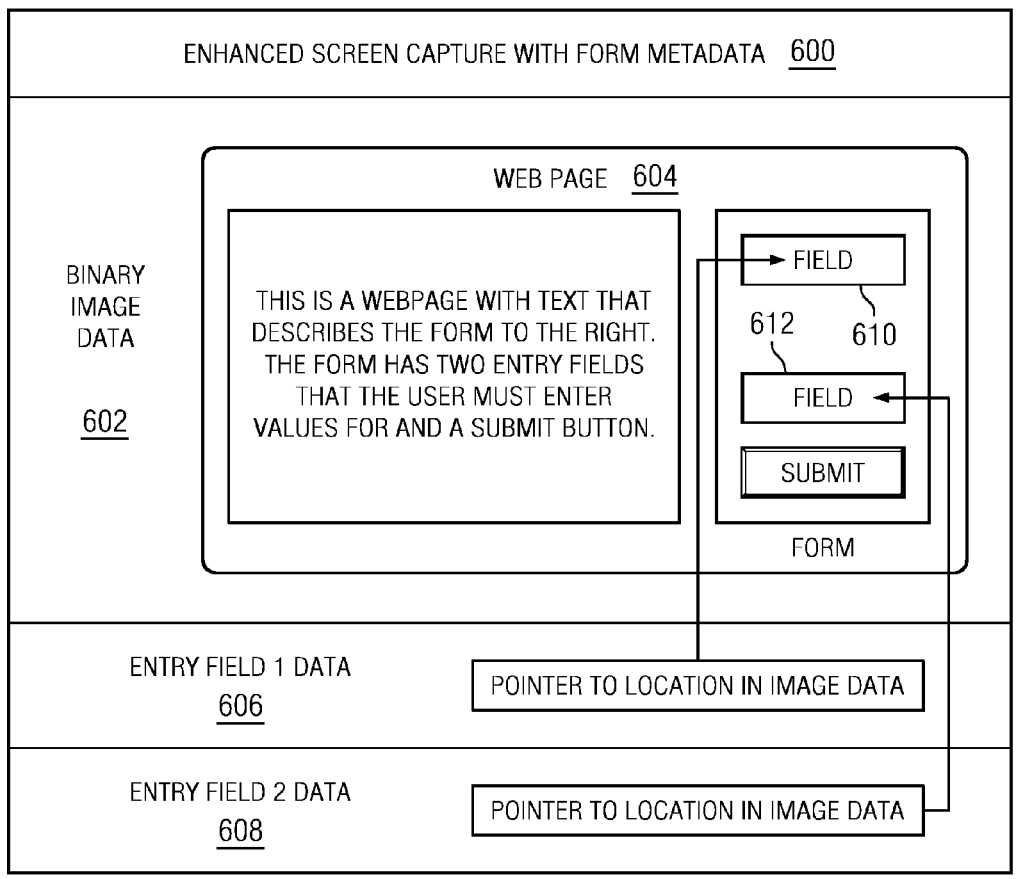
FIG. 6 is a block diagram of an enhanced screen capture with form metadata in which illustrative embodiments may be implemented.

With reference now to FIG. 6, a block diagram of an enhanced screen capture with form metadata is depicted in which illustrative embodiments may be implemented. Enhanced screen capture with form metadata 600 is an example of enhanced screen capture with form metadata 512 in FIG. 5.

Enhanced screen capture with form metadata 600 contains a method to capture binary image data 602 as well as entry field 1 data 606 and entry field 2 data 608. Binary image data 602 is the image of web page 604, which may be, for example, the computer screen or window that contains a form. Entry field 1 data 606 detects the field value for field 610, while entry field 2 data 608 detects the field value for field 612. Detection may be accomplished either through an understanding of specific forms or form software packages, form languages, optical character recognition, or through advanced means of image detections. In one illustrative embodiment, the user may select the form field values and/or data that should be stored in the image metadata. In another illustrative embodiment, all form field values are stored in the image metadata. The field values may be, for example, textual data, private textual data, a check box selection, or a list box selection.

Enhanced screen capture program 506 in FIG. 5 can further detect which form field values are private. A form field value that is private contains private textual data, such as, without limitation, a password or password object tag. The form field values that contain private textual data will be represented as secure fields and the original values, or private textual data, will not be stored in the image metadata.

Figure 7:
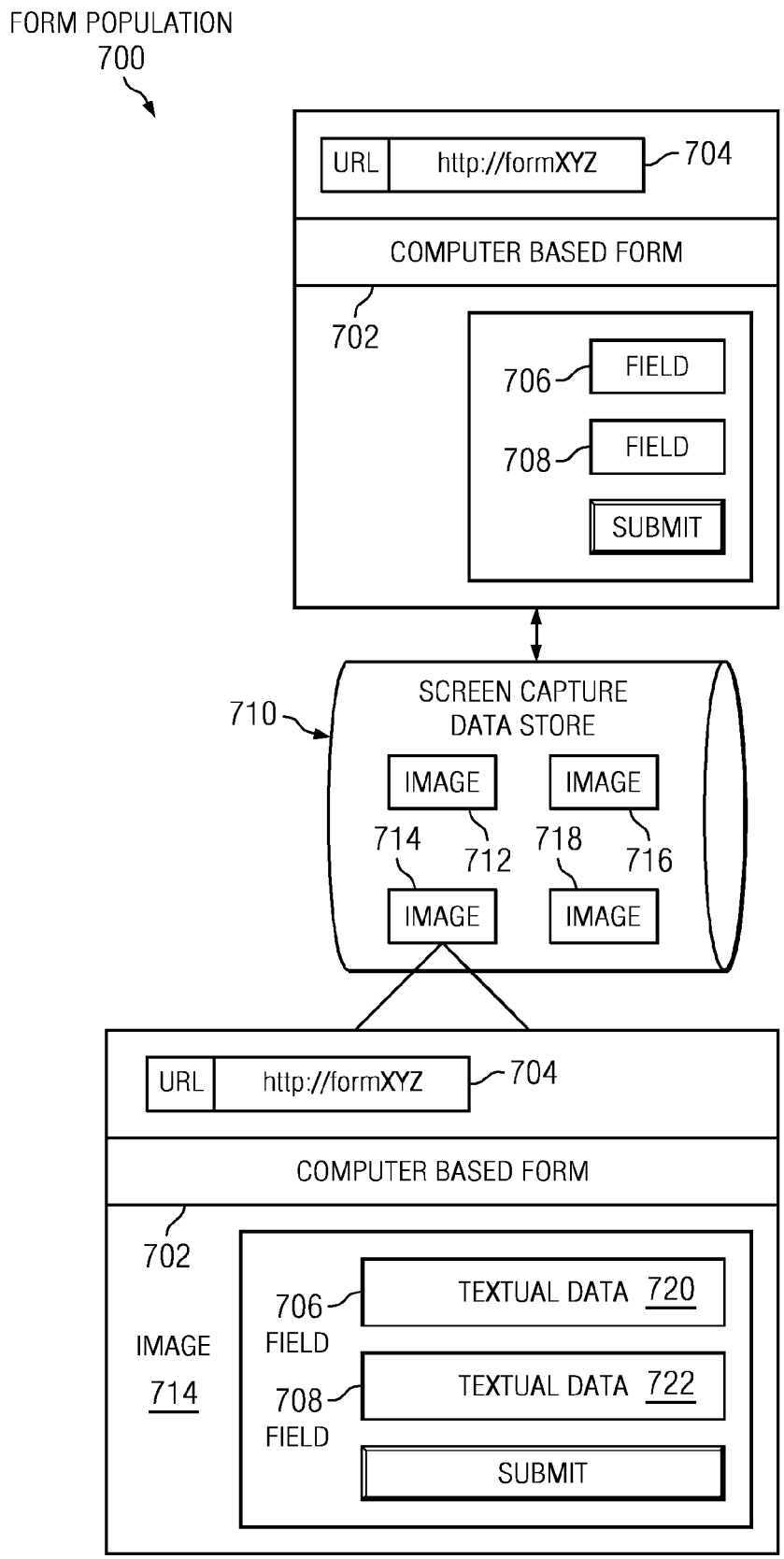
FIG. 7 is a block diagram of stored image retrieval for form population in which illustrative embodiments may be implemented.

With reference now to FIG. 7, a block diagram of stored image retrieval for form population is depicted in which illustrative embodiments may be implemented. Form population 700 is implemented by an enhanced screen capture program, such as screen capture program 500 in FIG. 5.

Computer based form 702 is an example of one illustrative embodiment in which a computer based form is accessed over a web browser. Computer based form 702 contains universal record locator 704, field 706, and field 708. When computer based form 702 is accessed by a user or process, such as user 514 in FIG. 5 for example, screen capture to form detector 408 in FIG. 4 detects computer based form 702 and identifies a matching stored form in screen capture data store 710. Screen capture data store 710 may be an illustrative example of one implementation of screen capture data store 402 in FIG. 4. The detection may be made by parsing the characteristics of computer based form 702 and comparing with the characteristics of the one or more stored forms in screen capture data store 710, such as images 712, 714, 716, and 718. Various means for parsing include, without limitation, comparing the application and form title or other identifier, such as a URL or window identifier, accessible via an application programming interface (API) call. To reduce queries to screen capture data store 710, upon application launch, screen capture data store 710 may be queried for any records from the application, and if none exist, the screen capture to form detector, such as screen capture to form detector 408 in FIG. 4, may cease monitoring the application for forms.

Screen capture data store 710 contains image 712, image 714, image 716, and image 718. Images 712, 714, 716, and 718, are examples of stored images with associated image metadata created by an enhanced screen capture program, such as screen capture program 500 in FIG. 5. Image 714 is an enhanced screen capture of computer based form 702. When computer based form 702 is accessed by a user, screen capture data store 710 is also accessed to determine whether a stored image correlating to computer based form 702 is stored in screen capture data store 710. In one illustrative embodiment, when the web browser recognizes universal record locator 704 as a previously accessed and stored computer based form, the web browser may pull image 714 with the identical universal record locator 704 from screen capture data store 710 and give the user an option to populate computer based form 702 with the data from image 714. For example, field 706 in image 714 contains textual data 720 and field 708 in image 714 contains textual data 722. The one or more selected textual or other data may then be passed to the web browser using an application program interface (API) call, such as sending the data to the document object model (DOM) of the web page to populate the fields corresponding to the selected textual or other data. In embodiments where there is no supplied API, another technique that may be used is sending an operating system call to select the application, and then sending key commands to the application. For example, upon selecting the web browser, two Tab keys may be sent, followed by sending the keys corresponding to the selected textual data, followed by sending an Enter key, which would have the same effect as selecting the second field on the form, typing the form data, and then clicking the form submit button. Other similar techniques such as input device manipulation and button interaction may be used.

Figure 8:
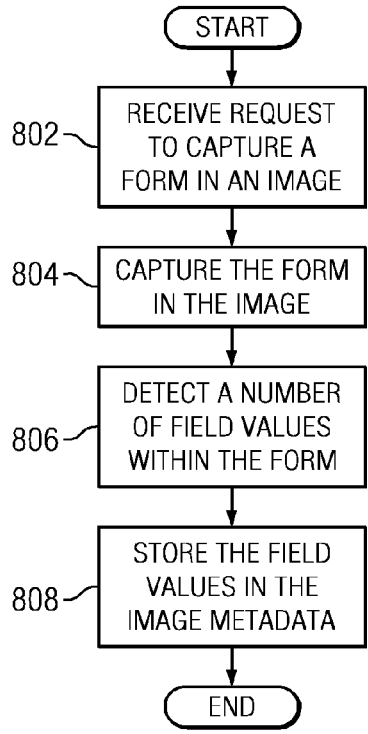
FIG. 8 is a flowchart illustrating a process for capturing a form in an image in which illustrative embodiments may be implemented.

With reference now to FIG. 8, a flowchart illustrating a process for capturing a form in an image is depicted in which illustrative embodiments may be implemented. The process may be implemented in enhanced screen capture program 506 in FIG. 5.

The process begins by receiving a request to capture a form in an image (step 802). This request may be invoked by a user, program, or process, such as user 502 invoking enhanced screen capture program 506 in FIG. 5. The process captures the form in the image (step 804) and detects a number of field values within the form (step 806). The field values may be, for example, textual data, private textual data, a check box selection, or a list box selection. The process then stores the field values in the image metadata (step 808), with the process terminating thereafter.

Figure 9:
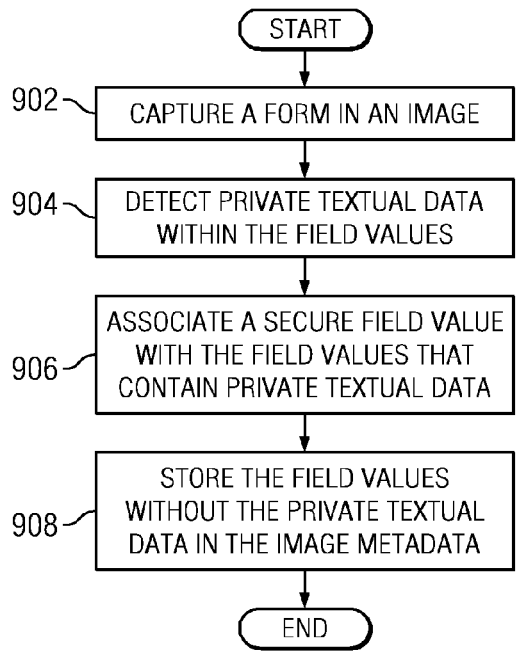
FIG. 9 is a flowchart illustrating a process for protecting secure data in a captured form in which illustrative embodiments may be implemented.

With reference now to FIG. 9, a flowchart illustrating a process for protecting secure data in a captured form is depicted in which illustrative embodiments may be implemented. The process may be implemented in enhanced screen capture program 506 in FIG. 5.

The process begins by capturing a form in an image (step 902). The process detects private textual data within the field values (step 904). Private textual data may be, for example, a password or password object tag. The process then associates a secure field value with the field values that contain private textual data (step 906). The process stores the field values without the private textual data in the image metadata (step 908), with the process terminating thereafter.

Figure 10:
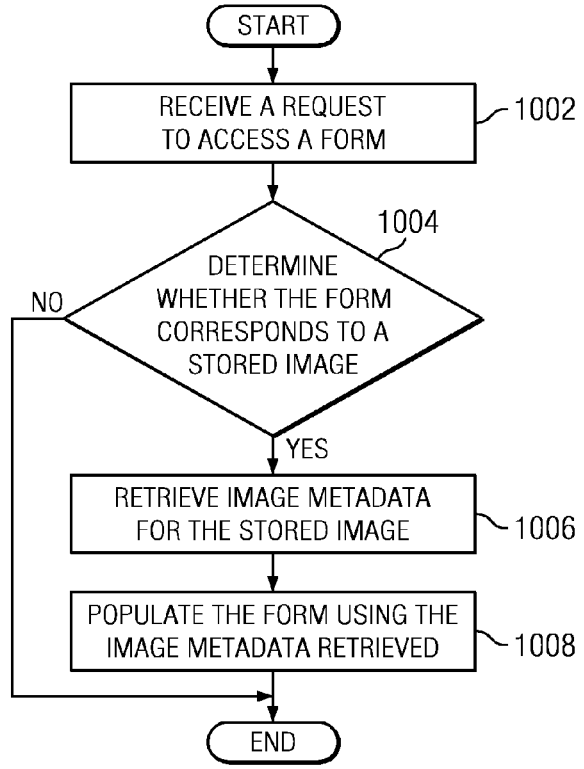
FIG. 10 is a flowchart illustrating a process for populating form field values in which illustrative embodiments may be implemented.

With reference now to FIG. 10, a flowchart illustrating a process for populating form field values is depicted in which illustrative embodiments may be implemented. The process may be implemented in enhanced screen capture program 506 in FIG. 5.

The process begins by receiving a request to access a form (step 1002). In an illustrative example, the request may be made by a user, process, or program, such as user 514 in FIG. 5 for example. The process determines whether the form corresponds to a stored image (step 1004), such as computer based form binary 508 in FIG. 5. If the form does not correspond to a stored image, the process terminates. If the form does correspond to a stored image, the process retrieves image metadata for the stored image (step 1006). The process then populates the form using the image metadata retrieved (step 1008), with the process terminating thereafter.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Therefore, the illustrative embodiments provide a method and computer program product for processing forms based on an image. A form is captured in an image, and a number of field values within the form in the image are detected. The number of field values is stored in the image metadata. Furthermore, field values containing sensitive or private data are detected and identified as secure fields. The data within the secure fields identified is not stored in the image metadata. This provides security for sensitive information, such as passwords in one illustrative example, that may be found within one or more field values within a form.

The illustrative embodiments further provide a method and computer program product for detecting an access request for a form. A determination is made as to whether the form corresponds to a stored image in a number of stored images. If the form corresponds to a stored image, metadata associated with the stored image is retrieved. The metadata includes a number of field values and associated textual data corresponding to the form. The form is populated with the number of field values and the associated textual data from the metadata associated with the stored image.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable storage device providing program code for use by or in connection with a computer or any instruction execution system. For the purposes of this description, a computer-usable or computer-readable storage device can be any tangible apparatus that can store the program for use by or in connection with the instruction execution system, apparatus, or device.

The computer-readable storage device can be an electronic, magnetic, optical, or semiconductor system (or apparatus or device). Examples of a computer-readable storage device include a semiconductor or solid state memory, magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for processing a form in an image, the method comprising the steps of:
   detecting, by one or more processors, a plurality of data fields within the form in the image;
   identifying, by the one or more processors, one or more of the data fields that contain private data and a plurality of the data fields that do not contain private data; and
   storing, as metadata for the image, contents of the plurality of data fields that do not contain private data and not storing, as metadata for the image, contents of the one or more data fields that contain private data.

2. The method of claim 1, wherein the content of the plurality of data fields within the form that do not contain private data contain a check box selection or a list box selection.

3. The method of claim 1, wherein the step of detecting, by the one or more processors, the plurality of data fields within the form in the image comprises the step of recognizing optical characters of text data within the plurality of data fields.

4. The method of claim 3, wherein the private text data are identified as private based on respective data field identifiers.

5. A computer program product for processing a form in an image, the computer program product comprising:

one or more computer-readable storage devices and computer-usable program code, stored on at least one of the one or more computer-readable storage devices, the computer-usable program code comprising:
   computer-usable program code to detect a plurality of data fields within the form in the image;
   computer-usable program code to identify one or more of the data fields that contain private data and a plurality of the data fields that do not contain private data; and
   computer-usable program code to store, as metadata for the image, contents of the plurality of data fields that do not contain private data and not store, as metadata for the image, contents of the one or more data fields that contain private data.

6. The computer program product of claim 5, wherein the content of the plurality of data fields within the form that do not contain private data contain a check box selection or a list box selection.

7. The computer program product of claim 5, wherein the computer-usable program code to detect the plurality of data fields within the form in the image comprises computer-usable program code to recognize optical characters of text data within the plurality of data fields.

8. The computer program product of claim 7, wherein the private text data are identified as private based on respective data field identifiers.

9. A computer system for processing a form in an image, the computer system comprising:
   one or more processors, one or more computer-readable memories, and one or more computer-readable storage devices, and computer-usable program code, stored on at least one of the one or more storage devices for execution by at least one of the one or more processors via at least one of the one or more memories, the computer-usable program code comprising:
   computer-usable program code to detect a plurality of data fields within the form in the image;
   computer-usable program code to identify one or more of the data fields that contain private data and a plurality of the data fields that do not contain private data; and
   computer-usable program code to store, as metadata for the image, contents of the plurality of data fields that do not contain private data and not store, as metadata for the image, contents of the one or more data fields that contain private data.

10. The computer system of claim 9, wherein the content of the plurality of data fields within the form that do not contain private data contain a check box selection or a list box selection.

11. The computer system of claim 9, wherein the computer-usable program code to detect the plurality of data fields within the form in the image comprises computer-usable program code to recognize optical characters of text data within the plurality of data fields.

12. The computer system of claim 11, wherein the private text data are identified as private based on respective data field identifiers.

* * * * *